United States Patent
Moon et al.

(10) Patent No.: US 10,616,381 B2
(45) Date of Patent: Apr. 7, 2020

(54) METHOD AND APPARATUS FOR PERFORMING HYBRID AUTOMATIC REPEAT REQUEST IN WIRELESS COMMUNICATION SYSTEM

(71) Applicant: Samsung Electronics Co., Ltd., Suwon-si, Gyeonggi-do (KR)

(72) Inventors: Jung-Min Moon, Suwon-si (KR); Seung-Hoon Park, Seoul (KR); Sun-Heui Ryoo, Yongin-si (KR); Byoung-Hoon Jung, Seoul (KR); Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/241,694

(22) Filed: Aug. 19, 2016

(65) Prior Publication Data

US 2017/0055248 A1    Feb. 23, 2017

Related U.S. Application Data

(60) Provisional application No. 62/208,198, filed on Aug. 21, 2015.

(30) Foreign Application Priority Data

Nov. 13, 2015    (KR) .................... 10-2015-0159853

(51) Int. Cl.
*H04L 29/06* (2006.01)
*H04L 1/18* (2006.01)
*H04L 1/00* (2006.01)

(52) U.S. Cl.
CPC ............ *H04L 69/22* (2013.01); *H04L 1/0003* (2013.01); *H04L 1/0009* (2013.01);
(Continued)

(58) Field of Classification Search
CPC ............................. H04L 1/1812; H04L 69/22
(Continued)

(56) References Cited

U.S. PATENT DOCUMENTS

2003/0035467 A1 *    2/2003    Shimizu .............. H04L 1/0025
                                                  375/147
2005/0249120 A1      11/2005   Heo et al.
(Continued)

*Primary Examiner* — Asad M Nawaz
*Assistant Examiner* — Berhanu D Belete
(74) *Attorney, Agent, or Firm* — Jefferson IP Law, LLP (57) ABSTRACT

The present disclosure relates to a pre-$5^{th}$-generation (pre-5G) or 5G communication system to be provided for supporting higher data rates beyond $4^{th}$-generation (4G) communication system such as long term evolution (LTE). A method and an apparatus for performing a hybrid automatic repeat request (HARQ) for reducing latency in wireless communication systems are provided. The method includes receiving a concatenated packet including a short transmission time interval (TTI) packet and a long TTI packet from a transmitter, decoding the short TTI packet, feeding, when decoding the short TTI packet fails, a negative acknowledgement (NACK) back to the transmitter, and receiving a retransmission packet including the short TTI packet and the long TTI packet from the transmitter.

38 Claims, 9 Drawing Sheets

(52) U.S. Cl.
CPC .......... *H04L 1/0026* (2013.01); *H04L 1/0036* (2013.01); *H04L 1/1812* (2013.01); *H04L 1/1854* (2013.01); *H04L 1/1887* (2013.01)

(58) Field of Classification Search
USPC .................................. 370/328, 338, 342, 394
See application file for complete search history.

(56) References Cited

U.S. PATENT DOCUMENTS

| | | | | |
|---|---|---|---|---|
| 2006/0034285 | A1* | 2/2006 | Pirskanen | H04L 1/0007 370/394 |
| 2007/0064669 | A1* | 3/2007 | Classon | H04L 1/1822 370/347 |
| 2007/0201404 | A1* | 8/2007 | Cheon | H04L 47/10 370/331 |
| 2007/0207742 | A1* | 9/2007 | Kim | H04B 7/12 455/69 |
| 2007/0245201 | A1* | 10/2007 | Sammour | H04L 1/1628 714/748 |
| 2009/0213750 | A1* | 8/2009 | Gorokhov | H04W 72/1231 370/253 |
| 2009/0245190 | A1* | 10/2009 | Higuchi | H04L 47/10 370/329 |
| 2009/0259911 | A1* | 10/2009 | Tseng | H04L 1/1812 714/748 |
| 2009/0303944 | A1* | 12/2009 | Fukuoka | H04L 5/0037 370/329 |
| 2010/0042884 | A1* | 2/2010 | Kuo | H04L 1/1887 714/748 |
| 2010/0088570 | A1* | 4/2010 | Choi | H04L 1/1812 714/751 |
| 2010/0111014 | A1* | 5/2010 | Kang | H04W 72/1268 370/329 |
| 2010/0111068 | A1 | 5/2010 | Wu | |
| 2013/0286970 | A1* | 10/2013 | Wang | H04W 72/04 370/329 |
| 2014/0126551 | A1* | 5/2014 | Nammi | H04L 1/0025 370/336 |
| 2014/0133471 | A1* | 5/2014 | Nammi | H04L 1/0025 370/336 |
| 2014/0211767 | A1* | 7/2014 | Lunttila | H04W 72/1289 370/336 |
| 2015/0071209 | A1* | 3/2015 | Chae | H04L 1/1887 370/329 |
| 2015/0117321 | A1* | 4/2015 | Chen | H04L 1/0013 370/329 |
| 2015/0124671 | A1 | 5/2015 | Tabet et al. | |
| 2015/0215082 | A1 | 7/2015 | Agiwal et al. | |
| 2015/0271755 | A1* | 9/2015 | Karri | H04W 52/0229 370/252 |
| 2017/0290008 | A1* | 10/2017 | Tooher | H04L 1/0007 |
| 2018/0103504 | A1* | 4/2018 | Quan | H04W 52/02 |
| 2018/0227958 | A1* | 8/2018 | Xiong | H04W 72/0406 |

* cited by examiner

METHOD AND APPARATUS FOR PERFORMING HYBRID AUTOMATIC REPEAT REQUEST IN WIRELESS COMMUNICATION SYSTEM

CROSS-REFERENCE TO RELATED APPLICATION(S)

This application claims the benefit under 35 U.S.C. § 119(e) of a U.S. provisional patent application filed on Aug. 21, 2015 in the U.S. Patent and Trademark Office and assigned Ser. No. 62/208,198, and under 35 U.S.C. § 119(a) of a Korean patent application filed on Nov. 13, 2015 in the Korean Intellectual Property Office and assigned Serial number 10-2015-0159853, the entire disclosure of each of which is hereby incorporated by reference.

TECHNICAL FIELD

The present disclosure relates to hybrid automatic repeat request (HARQ) methods and apparatuses in wireless communication systems. More particularly, the present disclosure relates to a method for performing HARQ by a receiver for reducing latency in a wireless communication system.

BACKGROUND

To meet the demand for wireless data traffic having increased since deployment of $4^{th}$-generation (4G) communication systems, efforts have been made to develop an improved $5^{th}$-generation (5G) or pre-5G communication system. Therefore, the 5G or pre-5G communication system is also called a 'beyond 4G network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Vigorous research efforts are recently underway to support low latency in wireless communication systems. Latency may be defined using, e.g., one-trip time which signifies the time between transmission of data by a transmitter and reception of the data by a receiver. Reducing the performance index representing such latency may quicken real-time streaming, vehicle-to-X (V2X), or other communication services.

For the following reasons, latency may occur:

First, in the case of uplink transmission, a user equipment (UE) requests a base station to do scheduling. The base station allocates uplink (UL) resources to the UE, and the UE transmits data to the base station. Such 3-step UL transmission procedure may increase the time between when data to be transmitted from the UE is generated and when the data is received by the base station.

Second, current LTE systems have been designed based on the transmission time interval (TTI) being 1 ms. The TTI of 1 ms means that the interval between two consecutive schedulings is 1 ms and that a base station or UE should wait up to 1 ms in order to transmit data. Such wait time is a cause of increasing the overall latency in the wireless communication system.

Third, a base station or UE, after receiving data, should conduct processing, such as encoding or decoding, on the received data. The processing time is another cause of increasing the overall latency in the wireless communication system.

Finally, when a receiver fails to receive data, a retransmission process, such as hybrid automatic repeat request (HARQ), is carried out. The retransmission process brings about acknowledgement (ACK)/negative ACK (NACK) feedback for determining whether data reception succeeds or fails, and failure to receive causes a delay due to the processing and retransmission of data already sent. In an LTE system, the transmitter chooses a proper modulation and coding scheme (MCS) utilizing a channel quality indicator (CQI) feedback or sounding reference signal transmitted from the receiver and transmits data by the chosen MCS. The receiver's failure to receive the data transmitted by the chosen MCS is typically attributed to a CQI mismatch. A CQI mismatch arises when the signal to interference plus noise ratio (SINR) and MCS when the transmitter generates data differ from the SINR and MCS of a link formed when the transmitter transmits data.

Meanwhile, LTE systems running on unlicensed bands are being researched. Such CQI mismatch may be drastically increased in LTE systems operated along with Wi-Fi access points (APs), on unlicensed bands. This is why the Wi-Fi APs, as hidden nodes, irregularly working in light of geographical location and time, may interfere with base stations or UEs in the LTE systems.

Figure 1A:
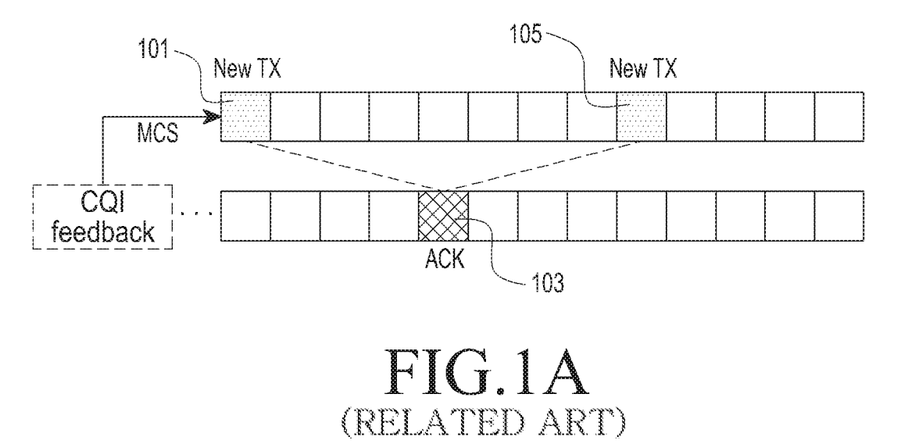
FIGS. 1A and 1B illustrate a hybrid automatic repeat request (HARQ) operation performed in a typical wireless communication system according to the related art.
Figure 1B:
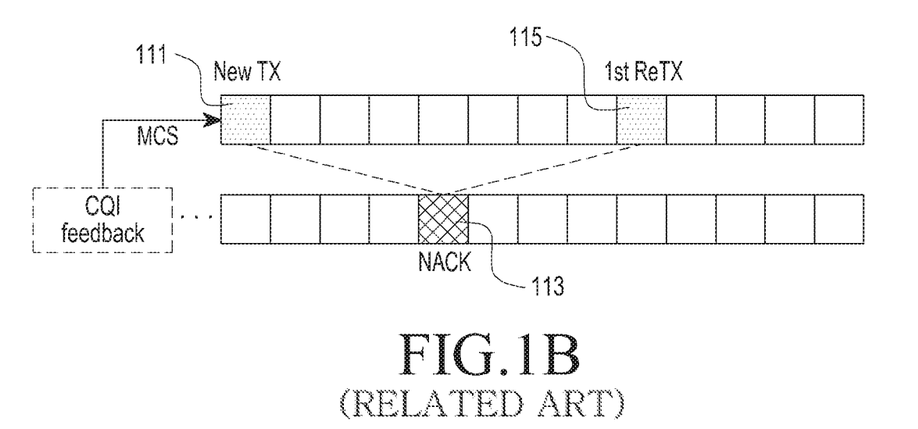

FIGS. 1A and 1B illustrate a HARQ operation performed in a typical wireless communication system according to the related art.

Referring to FIG. 1A, when a transmitter, after receiving a CQI feedback from a receiver, initially transmits data in an $n^{th}$ subframe according to an MCS selected corresponding to the CQI feedback (101), the receiver determines whether data is successfully received, and if so, feeds back an ACK in an n+$4^{th}$ subframe (103). When receiving the ACK, the transmitter transmits new data in an n+8th subframe (105).

Referring to FIG. 1B, when a transmitter, after receiving a CQI feedback from a receiver, initially transmits data in an $n^{th}$ subframe according to an MCS selected corresponding to the CQI feedback (111), the receiver determines whether data is successfully received, and if not, feeds back a NACK in an n+$4^{th}$ subframe (113). When receiving the NACK, the transmitter retransmits the data initially transmitted in the n+8th subframe (115). Accordingly, a HARQ round-trip time occurring in the HARQ operation shown in FIGS. 1A and 1B may be regarded as 8 ms because one TTI is 1 ms.

As such, a need exists for a scheme for reducing latency occurring in the general HARQ operation, and such latency may be more frequent in LTE systems operating together with Wi-Fi APs on unlicensed bands.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a hybrid automatic repeat request (HARQ) method and apparatus that may reduce latency in a wireless communication system.

Another aspect of the present disclosure is to provide a HARQ method and apparatus using a quick negative acknowledgement (NACK) feedback in a wireless communication system.

Another aspect of the present disclosure is to provide a HARQ method and apparatus using transmission time interval (TTI) concatenation including a short TTI in a wireless communication system.

In accordance with an aspect of the present disclosure, a method for performing a HARQ by a receiver in a wireless communication system is provided. The method includes receiving a concatenated packet including a short TTI packet and a long TTI packet from a transmitter, decoding the short TTI packet, feeding, when decoding the short TTI packet fails, a NACK back to the transmitter, and receiving a retransmission packet including the short TTI packet and the long TTI packet from the transmitter.

In accordance with another aspect of the present disclosure, a receiver performing a HARQ in a wireless communication system is provided. The receiver includes a transceiver configured to communicate data and at least one processor configured to control to receive a concatenated packet including a short TTI packet and a long TTI packet from a transmitter, decode the short TTI packet, feed, when decoding the short TTI packet fails, a NACK back to the transmitter, and receive a retransmission packet including the short TTI packet and the long TTI packet from the transmitter.

In accordance with another aspect of the present disclosure, a method for performing an HARQ by a transmitter in a wireless communication system is provided. The method includes transmitting a concatenated packet including a short TTI packet and a long TTI packet, and transmitting, when receiving a NACK responsive to reception of the short TTI packet from a receiver receiving the concatenated packet, a retransmission packet including the short TTI packet and the long TTI packet.

In accordance with another aspect of the present disclosure, a transmitter performing a HARQ in a wireless communication system is provided. The transmitter includes a transceiver configured to communicate data and at least one processor configured to control to transmit a concatenated packet including a short TTI packet and a long TTI packet, and transmit, when receiving a NACK responsive to reception of the short TTI packet from a receiver receiving the concatenated packet, a retransmission packet including the short TTI packet and the long TTI packet.

In accordance with another aspect of the present disclosure, a method for performing a HARQ in a wireless communication system is provided. The method includes feeding channel state information back to a transmitter, receiving data from the transmitter according to the channel state information, comparing a first modulation and coding scheme (MCS) corresponding to the channel state information with a second MCS identified based on a reference signal received along with the data, transmitting, when the first MCS mismatches the second MCS, a NACK to the transmitter, and receiving retransmission data from the transmitter responsive to the NACK.

In accordance with another aspect of the present disclosure, a receiver performing a HARQ in a wireless communication system is provided. The receiver includes a transceiver configured to communicate data and at least one processor configured to control to feed channel state information back to a transmitter, receive data from the transmitter according to the channel state information, compare a first MCS corresponding to the channel state information with a second MCS identified based on a reference signal received along with the data, transmit, when the first MCS mismatches the second MCS, a NACK to the transmitter, and receive retransmission data from the transmitter responsive to the NACK.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to embodiments of the present disclosure, suggested are two hybrid automatic repeat request (HARQ) methods for reducing latency in a wireless communication system.

The first one is a HARQ method using a quick negative acknowledgement (NACK) feedback due to a channel quality indicator (CQI) mismatch.

The second one is a HARQ method using transmission time interval (TTI) concatenation including a short TTI.

Figure 2:
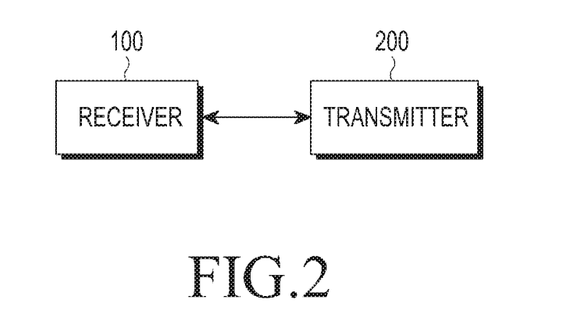
FIG. 2 illustrates a configuration of a wireless communication system performing HARQ according to an embodiment of the present disclosure.

FIG. 2 illustrates a configuration of a wireless communication system performing HARQ according to an embodiment of the present disclosure.

Referring to FIG. 2, the two HARQ methods are described.

The first HARQ method using quick NACK feedback due to a CQI mismatch is now described. Generally, the time taken for the receiver in the wireless communication system to receive a reference signal and then derive the modulation and coding scheme (MCS) through channel estimation using the reference signal is shorter than the time taken for the receiver to receive data from the transmitter and then decode the data to determine whether the reception succeeds or fails. CQI corresponds to MCS, and thus, the CQI mismatch may be appreciated as an MCS mismatch.

In the system shown in FIG. 2, a receiver 100 identifies the MCS at the time when a transmitter 200 transmitted the data (hereinafter, "$MCS_{transmission}$") through the reference signal included in the subframe where the data is transmitted and identifies the MCS corresponding to the CQI fed back lastly (i.e., at the latest) from the receiver 100 to the transmitter 200 (hereinafter, $MCS_{data}$). $MCS_{data}$ may be appreciated as MCS at the time when the transmitter 200 generated data to be transmitted (i.e., MCS applied to the data).

In the instant embodiment of the present disclosure, when $MCS_{transmission}$ is lower than $MCS_{data}$ by a certain level (e.g., N-level), the receiver 100 immediately requests the transmitter 200 to retransmit. $MCS_{transmission}$ being lower than $MCS_{data}$ by the N-level indicates that at the time data is actually transmitted or received, the SINR between the transmitter 200 and the receiver 100 is relatively low, but data transmitted is generated assuming a higher signal to interference plus noise ratio (SINR). Accordingly, when $MCS_{transmission}$ is lower than $MCS_{data}$ by the N-level an existing receiver operating in the HARQ scheme may be said to be highly likely to fail to receive data. Thus, in the instant embodiment of the present disclosure, even when decoding data received from the transmitter 200 is not terminated yet, the receiver 100 is operated to request the transmitter 200 to immediately retransmit by the above-described MCS comparison.

Figure 3A:
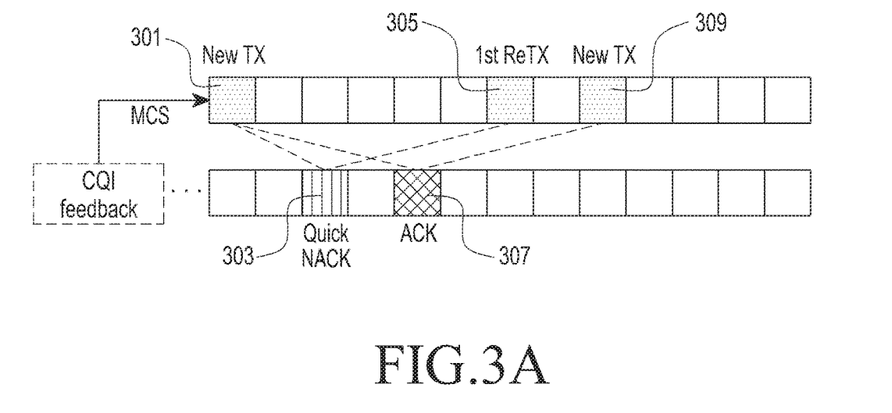
FIGS. 3A and 3B illustrate a HARQ method using a quick negative acknowledgment (NACK) feedback according to an embodiment of the present disclosure.
Figure 3B:
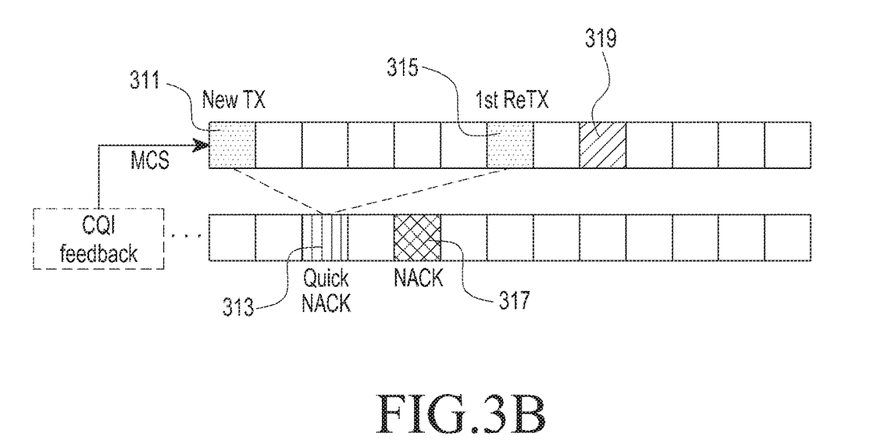

FIGS. 3A and 3B illustrate a HARQ method using a quick NACK feedback according to an embodiment of the present disclosure. It is assumed in the example shown in FIGS. 3A and 3B that initial (re)transmission of data is performed on a per-subframe basis.

Referring to FIGS. 3A and 3B, when the transmitter 200 receives a CQI feedback from the receiver 100 and then initially transmits data in a subframe according to the selected MCS (301 and 311), the receiver 100 performs channel estimation using the reference signal contained in the subframe of the data initially transmitted from the transmitter 200 and compares $MCS_{transmission}$ with $MCS_{data}$. When a result of the comparison shows that the difference between $MCS_{transmission}$ and $MCS_{data}$ is a N-level or more, the receiver 100 immediately feeds back to the transmitter 200 a quick NACK after a minimum processing time (e.g., the time of one subframe in the example shown in FIG. 3A) required for the channel estimation and comparison (303 and 313). When receiving the quick NACK, the transmitter 200 re-performs the initial transmission after a processing time required for generating retransmission data (305 and 315).

Meanwhile, FIG. 3A illustrates an example in which decoding the data initially transmitted shows that the reception succeeds. In this case, the receiver 100 feeds back an ACK to the transmitter 200 like in a normal HARQ operation (307), and when receiving the ACK, the transmitter 200 initially transmits new data (309). FIG. 3B illustrates an example in which decoding the data initially transmitted shows that the reception fails. In this case, the receiver 100 feeds back a NACK to the transmitter 200 like in a normal HARQ operation (317), and when receiving the NACK, the transmitter 200 omits a retransmission operation because the transmitter 200 has already transmitted retransmission data by the reception of the quick NACK (319).

Thus, the instant embodiment may reduce a delay to retransmission as contrasted with the legacy HARQ operation. The HARQ method using the quick NACK feedback may apply to uplink as well as downlink.

Figure 4:
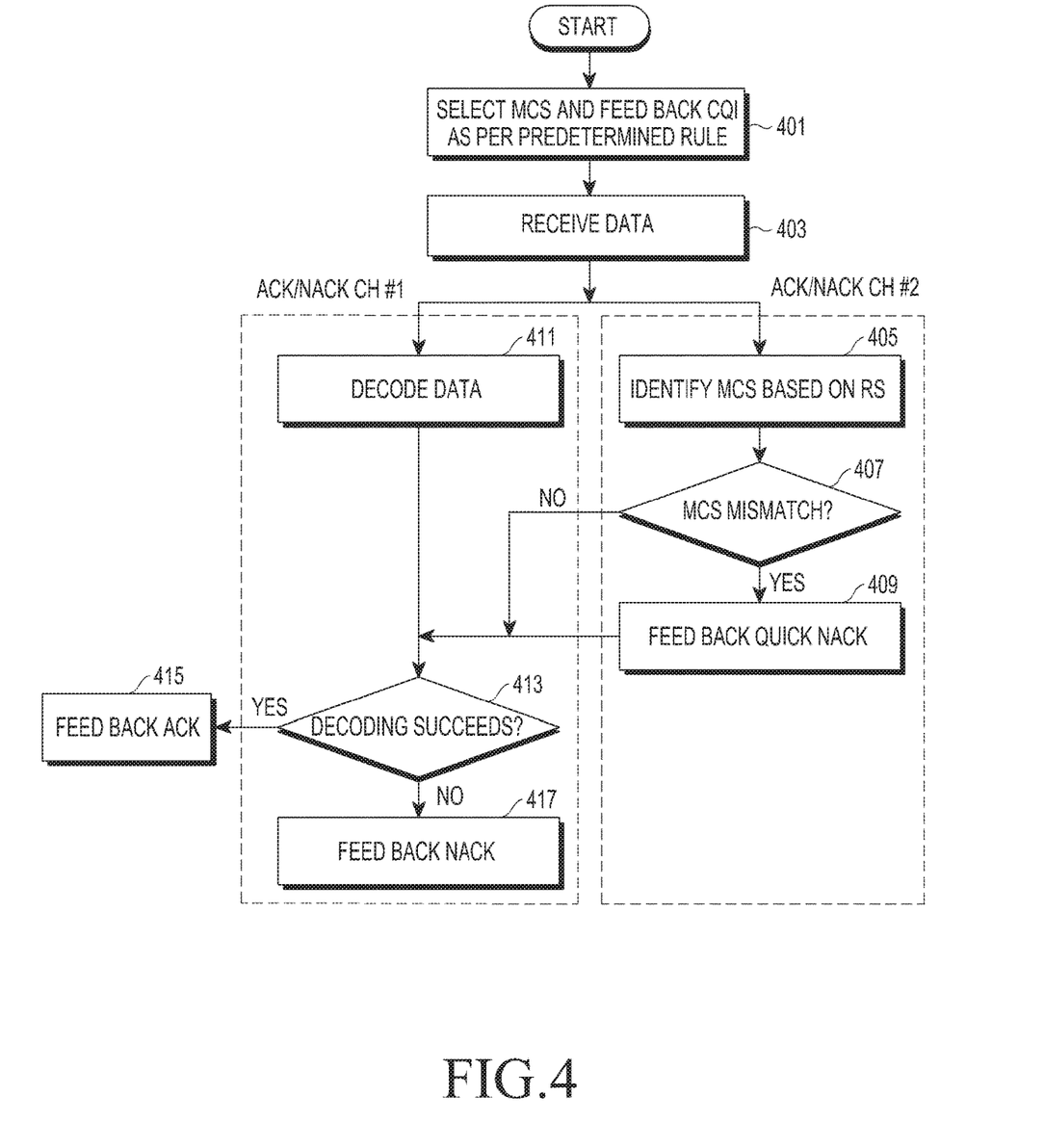
FIG. 4 is a flowchart illustrating a method performed by a receiver conducting a HARQ operation using a quick NACK feedback according to an embodiment of the present disclosure.

FIG. 4 is a flowchart illustrating a method performed by a receiver conducting a HARQ operation using a quick NACK feedback according to an embodiment of the present disclosure.

Referring to FIG. 4, the receiver 100 selects an MCS as per a certain rule and feeds back a CQI in operation 401. Operation 401 may adopt a known operation of a wireless communication system that selects an MCS and feeds back a CQI corresponding to the selected MCS. In operation 403, the receiver 100 receives data transmitted from the transmitter 200 as per the CQI. In operation 405, the receiver 100 performs channel estimation using a reference signal contained in a subframe of data transmitted from the transmitter 200 to identify the MCS (i.e., $MCS_{transmission}$) at the time that the transmitter 200 transmitted the data. In operation 407, the receiver 100 compares $MCS_{transmission}$ and an MCS (i.e., $MCS_{data}$) corresponding to a CQI last fed back to the transmitter 200 to determine whether there is an MCS mismatch (that is, whether the difference between $MCS_{transmission}$ and $MCS_{data}$ is not less than a certain level). When it is determined that there is an MCS mismatch, the receiver 100 immediately feeds back a quick NACK to the transmitter 200 in operation 409.

Meanwhile, when receiving data in operation 403, the receiver 100 performs operation 405 and decodes the received data in operation 411. When the result of decoding shows that reception succeeds in operation 413, the receiver 100 goes to operation 415 to feed back an ACK as in the normal HARQ operation, and when the result of decoding shows that reception fails in operation 413, the receiver 100 goes to operation 417 to feed back a NACK to the transmitter 200 as in the normal HARQ operation. Here, operations 413 to 417 may be performed after the operation as per the determination (operation 407) has been carried out.

Meanwhile, although not shown in FIG. 4, the receiver 100 alternatively identifies whether the feedback of a quick NACK in operation 409 is performed when the decoding result shows that reception fails, and when feedback of the quick NACK is performed, the receiver 100 omits the feedback of a NACK to the transmitter 200. When the feedback of the quick NACK is not performed, the receiver 100 feeds back a NACK to the transmitter 200.

Figure 5:
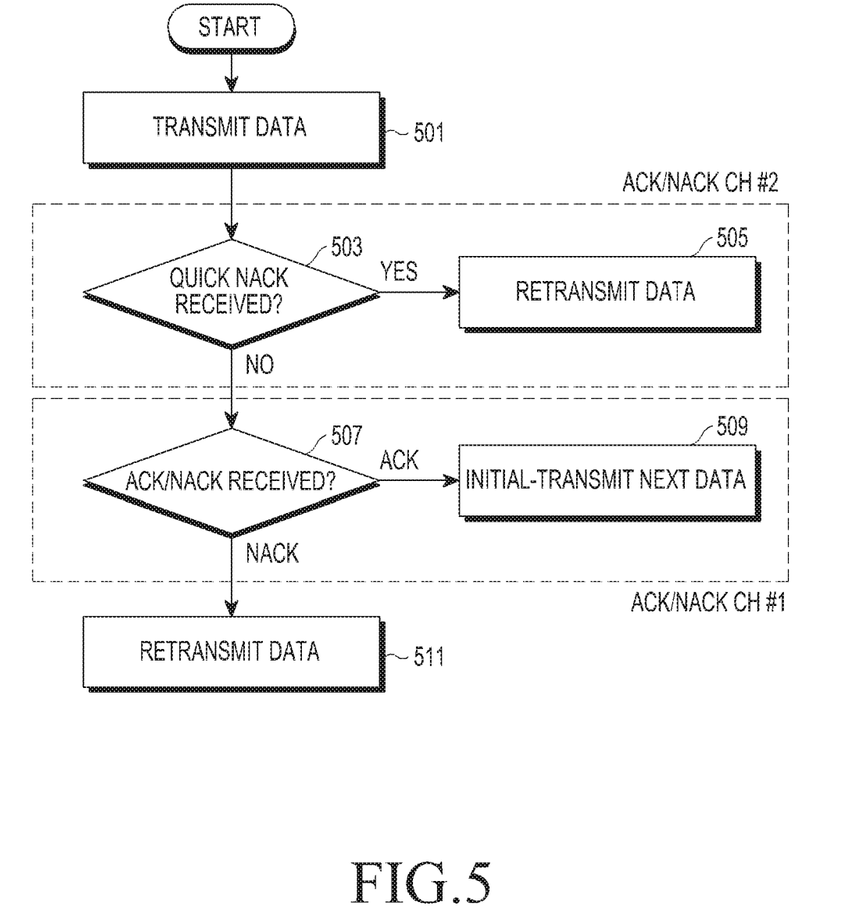
FIG. 5 is a flowchart illustrating a method performed by a transmitter conducting a HARQ operation using a quick NACK feedback according to an embodiment of the present disclosure.

FIG. 5 is a flowchart illustrating a method performed by a transmitter conducting a HARQ operation using a quick NACK feedback according to an embodiment of the present disclosure.

Referring to FIG. 5, the transmitter 200 receives a CQI fed back from the receiver 100 and applies an MCS as per the received CQI and transmits data in operation 501. When receiving a quick NACK from the receiver 100 in operation 503, the transmitter 200 goes to operation 505 to transmit retransmission data. The retransmission data may be generated as per a normal HARQ method. When not receiving a quick NACK in operation 503, the transmitter 200 determines whether to receive an ACK/NACK responsive to the data transmitted in operation 501 according to a normal HARQ operation in operation 507. When receiving an ACK in operation 507, the transmitter 200 goes to operation 509 to perform initial transmission of new data again. When receiving a NACK in operation 507, the transmitter 200 goes to operation 511 to transmit retransmission data.

The HARQ operation using the quick NACK feedback may be performed in the second or subsequent retransmission operation as well as in the first retransmission operation after the initial transmission.

Figure 6A:
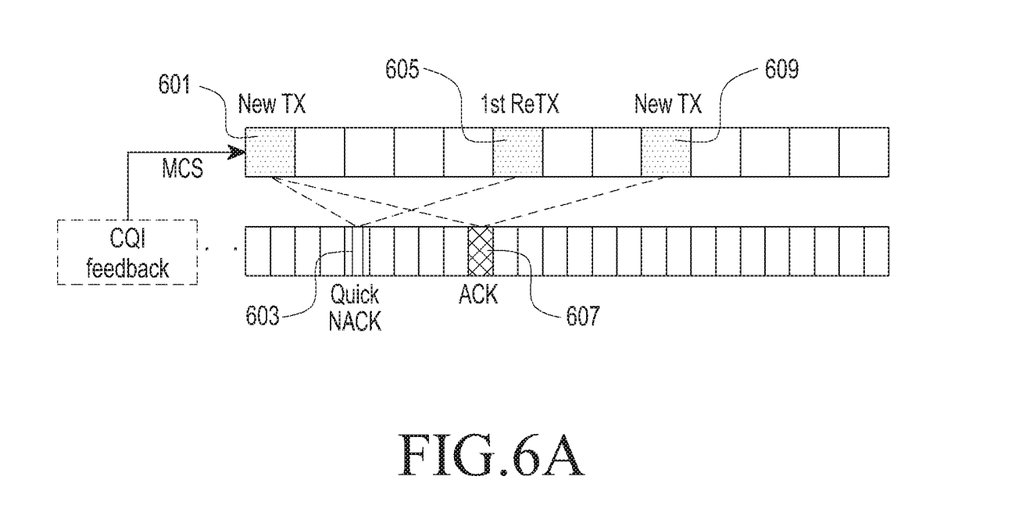
FIGS. 6A and 6B illustrate a HARQ method using a quick NACK feedback according to an embodiment of the present disclosure.
Figure 6B:
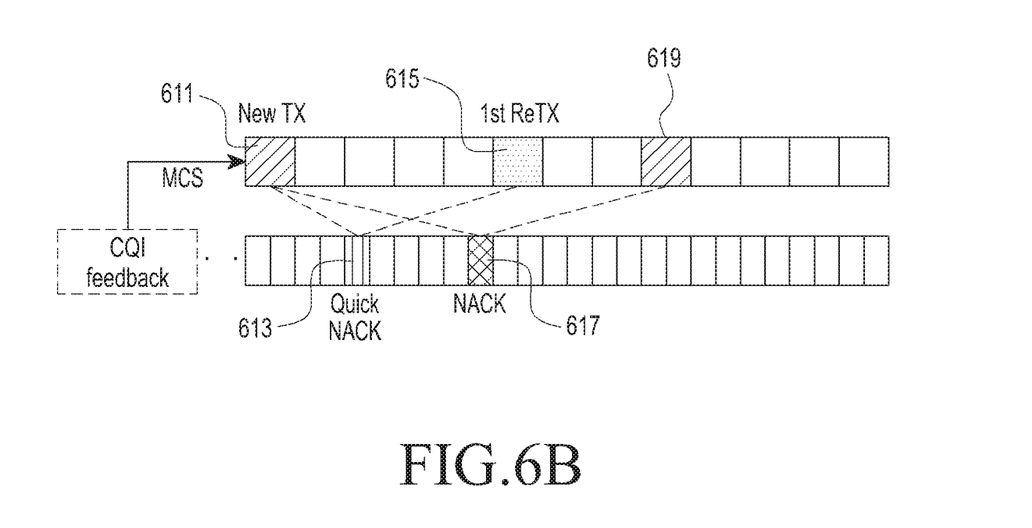

FIGS. 6A and 6B illustrate a HARQ method using a quick NACK feedback according to an embodiment of the present disclosure. In the embodiment shown in FIGS. 6A and 6B, described is an example in which the receiver 100 transmits or receives data through a carrier including a short TTI (e.g., when the TTI is 1 ms, the short TTI is shorter than 1 ms (e.g., 0.5 ms)). In this case, the receiver 100 has a chance of transmission of normal ACK/NACK and quick NACK at every 0.5 ms. Accordingly, the embodiment shown in FIGS. 6A and 6B may further shorten the retransmission time than the embodiment shown in FIGS. 3A and 3B does.

Referring to FIGS. 6A and 6B, when the transmitter 200 transmits data (601 and 611), the receiver 100 performs channel estimation using the reference signal contained in the subframe of the data transmitted from the transmitter 200 and compares $MCS_{transmission}$ with $MCS_{data}$. When a result of the comparison shows that the difference between $MCS_{transmission}$ and $MCS_{data}$ is a certain level, the receiver 100 immediately feeds back a quick NACK to the transmitter 200 (603 and 613). When receiving the quick NACK, the transmitter 200 transmits retransmission data (605 and 615).

Meanwhile, FIG. 6A illustrates an example in which decoding the data shows that the reception succeeds. In this case, the receiver 100 feeds back an ACK to the transmitter 200 like in a normal HARQ operation (607), and when receiving the ACK, the transmitter 200 performs initial transmission of new data again (609). FIG. 6B illustrates an example in which decoding the data shows that the reception fails. In this case, the receiver 100 feeds back a NACK to the transmitter 200 like in a normal HARQ operation (617), and when receiving the NACK, the transmitter 200 omits a retransmission operation because the transmitter 200 has already transmitted retransmission data by the reception of the quick NACK (619).

In order to perform the HARQ method using the quick NACK feedback, information exchangeable between transmitter and receiver according to an embodiment of the present disclosure may include at least one of 1) to 5) example pieces of information.

1) resource information for receiver to feed back a quick NACK 2) information on timing that receiver feeds back a quick NACK (k subframes after initial transmission)

3) information on timing that transmitter performs retransmission after reception of a quick NACK (k' subframes after initial transmission)

4) information as to whether receive omits normal NACK feedback transmission after feeding back a quick NACK or performs normal NACK feedback transmission as it does in the related art 5) information regarding conditions under which receiver feeds back a quick NACK (parameter N corresponding to the difference between $MCS_{transmission}$ and $MCS_{data}$)

Meanwhile, when the HARQ method using the quick NACK feedback applies to the long term evolution (LTE) system, the download (DL) subframe in the LTE system always includes a cell-specific reference signal. However, the uplink (UL) subframe does not always include such reference signal. Accordingly, in order to apply the HARQ method using the quick NACK to UL, a UL sounding reference signal (SRS) should be transmitted along with data so that the receiver may seamlessly perform channel estimation in the subframe where data is transmitted. To that end, the user equipment (UE) assigned a particular resource block may be rendered to transmit an SRS in a resource for SRS adjacent to the particular resource block.

Meanwhile, although CQI is described as an example of channel state information transmitted from receiver to transmitter in the HARQ method using the quick NACK feedback, this is merely an example, and rather, various pieces of information which may represent channel state may be put to use.

A second HARQ method according to an embodiment of the present disclosure, i.e., a HARQ method using TTI concatenation including short TTI, is described below.

According to the instant embodiment of the present disclosure, suggested is a HARQ method having advantages of both long TTI and short TTI by using different TTIs together upon data transmission. Such HARQ method enables quick retransmission to raise performance in light of latency. For such purpose, comparison in characteristics between long TTI and short TTI is made and results are shown in Table 1 below.

TABLE 1

|  | Long TTI | Short TTI |
| --- | --- | --- |
| Processing time | Long (large transport block size) | Short (small transport block size) |
| HARQ round trip time (RTT) | Long | Short |
| Feedback overhead | Low | High |
| Control signal overhead | Low | High |

As shown in Table 1 above, use of short TTI may lead to a shorter processing time than when long TTI is used. Generally, processing time is proportional to transport block size, and use of short TTI enables transmission of a smaller transport block as compared with when long TTI is used. Such difference enables a short TTI-applied receiver to determine whether data reception succeeds than when long TTI applies while allowing a transmitter to much rapidly generate retransmission data. Accordingly, according to this embodiment of the present disclosure, applying short TTI may provide for a shorter HARQ RTT.

Figure 7A:
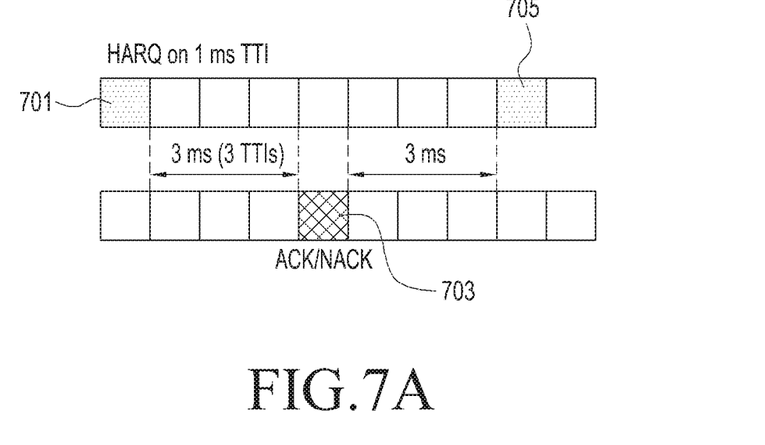
FIGS. 7A and 7B illustrate a short transmission time interval (TTI) according to an embodiment of the present disclosure.
Figure 7B:
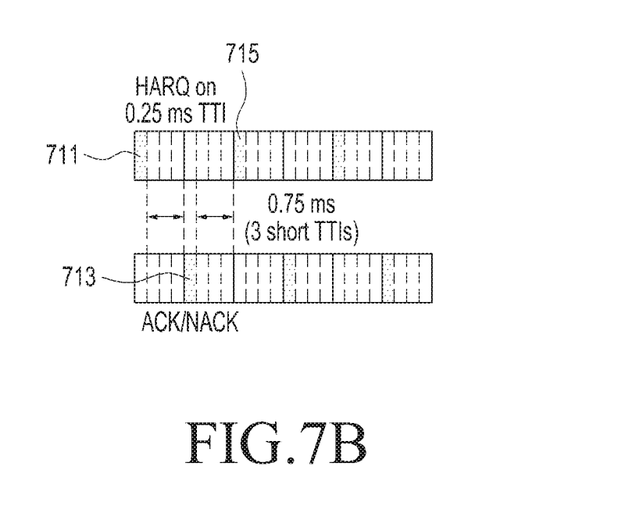

FIGS. 7A and 7B illustrate a short TTI according to an embodiment of the present disclosure.

FIG. 7A illustrates a legacy HARQ timeline based on, e.g., 1 ms TTI, and FIG. 7B illustrates a HARQ timeline based on a short TTI, e.g., 0.25 ms TTI. The 0.25 ms TTI is merely an example of short TTI, and any TTI which is shorter than the reference TTI may serve as the short TTI.

Referring to FIG. 7A, in the reference TTI, e.g., 1 ms TTI, ACK/NACK feedback transmission is conducted (703) 3 ms after initial transmission (701), and retransmission for initial transmission is performed 3 ms after the ACK/NACK feedback transmission (705).

Referring to FIG. 7B where short TTI applies on the contrary, in the 0.25 ms TTI, ACK/NACK feedback transmission is performed (713) 0.75 ms after initial transmission (711), and retransmission for initial transmission is performed 0.75 ms after ACK/NACK feedback transmission (715). Accordingly, it can be shown that application of short TTI may significantly reduce HARQ RTT.

Figures 8A, 8B:
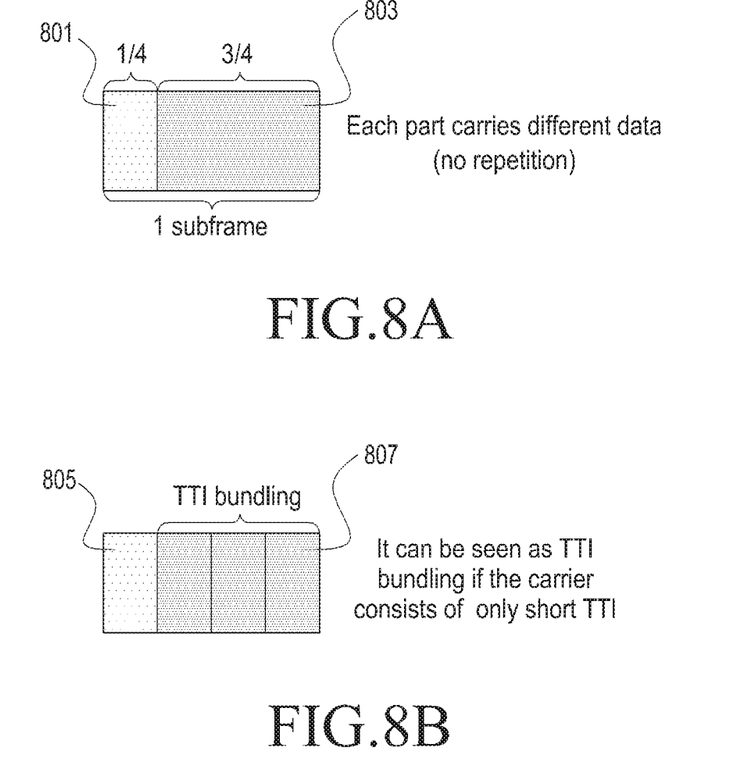
FIGS. 8A and 8B illustrate a concatenated packet including a short TTI packet according to an embodiment of the present disclosure.

FIGS. 8A and 8B illustrate a concatenated packet including a short TTI packet according to an embodiment of the present disclosure.

In this embodiment of the present disclosure, one subframe transmits a concatenated packet which includes a short TTI packet and long TTI packet longer than the short TTI packet.

Referring to FIGS. 8A and 8B, the transmitter generates packets 801 and 805 having a short TTI as a portion of data to be transmitted in a subframe and packets 803 and 807 having a long TTI as the rest of the data in the subframe. FIG. 8A illustrates an example of configuring long TTI packets longer than short TTI packets, and FIG. 8B illustrates an example of configuring long TTI packets by bundling multiple short TTI packets when the carrier is configured of only short TTIs in the system.

As an example, the short TTI packets may be 0.25 ms, and the long TTI packets may be 0.75 ms long. As another example, the concatenated packet may include two packets having TTIs of the same length. As another example, a portion of the data to be transmitted in the subframe may include multiple short TTI packets, and the rest may include multiple long TTI packets. The concatenated packet is under a basic assumption that short TTI packets are placed in the head of the subframe while long TTI packets are in the tail of the subframe. However, an opposite position may also be possible. For example, short TTI packets are placed in the tail of the subframe while long TTI packets are in the head of the subframe.

Figure 9:
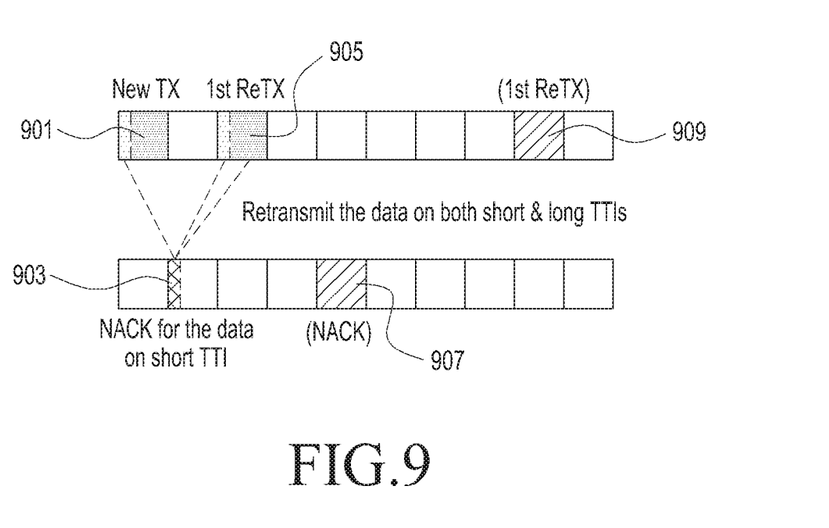
FIG. 9 illustrates a HARQ method using TTI concatenation including a short TTI according to an embodiment of the present disclosure.

FIG. 9 illustrates a HARQ method using TTI concatenation including a short TTI according to an embodiment of the present disclosure. The embodiment shown in FIG. 9 is described with reference to FIG. 2.

Referring to FIG. 9, the transmitter 200 generates and transmits a concatenated packet including short TTI packets by the scheme described above in connection with FIGS. 8A and 8B (901). The receiver 100 decodes the short TTI packets, and when the result of decoding shows that reception of the short TTI packets succeeds, the receiver 100 feeds back an ACK responsive to the short TTI packets. Thereafter, the receiver 100 decodes the long TTI packets. When the result of decoding shows that reception of the long TTI packets succeeds, the receiver 100 feeds back an ACK. However, upon failure to receive the long TTI packets, the receiver 100 feeds back a NACK. In this case, the transmitter 200 performs a normal HARQ operation depending on whether to receive the ACK or NACK. In other words, the transmitter 200 performs new transmission when receiving the ACK responsive to the long TTI packets and performs retransmission of initial transmission when receiving the NACK responsive to the long TTI packets.

Meanwhile, upon failing to receive the short TTI packets, the receiver 100 feeds back a NACK responsive to the short TTI packets like in the example shown in FIG. 9. In this case, the transmitter 200 having transmitted the NACK responsive to the short TTI packets (903) retransmits long TTI packets concatenated with the short TTI packets as well as the short TTI packets (905). When the overall length of the concatenated packet is smaller than, e.g., 1 ms, each packet, i.e., short TTI packet and long TTI packet, is highly likely to experience the same SINR, and when a decoding failure occurs, the two packets both have a higher chance of undergoing a decoding failure. For such reason, in this embodiment of the present disclosure, when the receiver 100 fails to receive the short TTI packet, the transmitter 200 retransmits both the short TTI packet and long TTI packet. Accordingly, as contrasted with the legacy HARQ scheme that causes a delay due to long processing time required for packet retransmission, the instant embodiment allows for retransmission within a short time without delay.

Thereafter, the receiver 100 decodes the long TTI packets. When the decoding result shows that the receiver 100 successfully receives the long TTI packet, the receiver 100 feeds back an ACK, and when the decoding result shows failure to receive the long TTI packet, the receiver 100 feeds back a NACK (907) as in the example shown in FIG. 9. The transmitter 200 may conduct new transmission regardless of whether retransmission is performed prior to the reception of ACK responsive to the long TTI packet. On the contrary, in the example shown in FIG. 9, the transmitter 200 may perform or skip additional retransmission (909) upon reception of a NACK responsive to the long TTI packet because the transmitter 200 has carried out retransmission of long TTI packet before. The above two designs are optionable.

Figure 10:
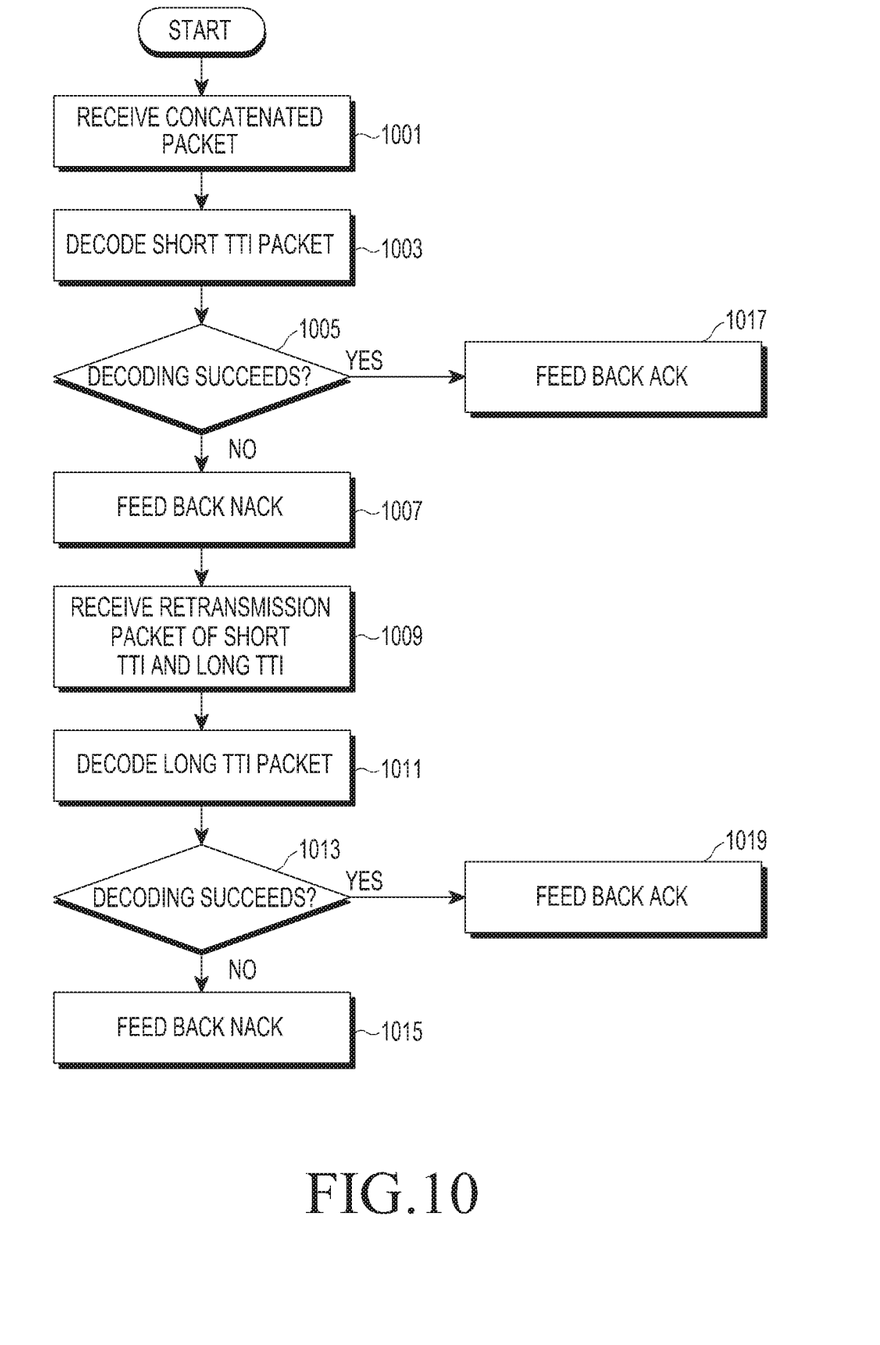
FIG. 10 is a flowchart illustrating a method performed by a receiver conducting a HARQ operation using TTI concatenation including a short TTI according to an embodiment of the present disclosure.

FIG. 10 is a flowchart illustrating a method performed by a receiver conducting a HARQ operation using TTI concatenation including a short TTI according to an embodiment of the present disclosure.

Referring to FIG. 10, in operation 1001, the receiver 100 receives a concatenated packet including a short TTI packet and long TTI packet from the transmitter 200. In operation 1003, the receiver 100 decodes the short TTI packet, and in operation 1005, the receiver 100 determines whether the decoding succeeds. When decoding the short TTI packet fails, the receiver 100 feeds back to the transmitter 200 a NACK responsive to the short TTI packet in operation 1007. In operation 1009, the receiver 100 receives retransmission packets including the short TTI packet and long TTI packet from the transmitter 200. In operation 1011, the receiver 100 decodes the long TTI packet, and in operation 1013, the receiver 100 determines whether the decoding succeeds. When decoding the long TTI packet fails, the receiver 100 feeds back to the transmitter 200 a NACK responsive to the long TTI packet in operation 1015. On the other hand, when decoding the short TTI packet succeeds in operation 1005, the receiver 100 feeds back to the transmitter 200 an ACK responsive to the short TTI packet in operation 1017 and performs operations subsequent to operation 1011. When decoding the long TTI packet succeeds in operation 1013, the receiver 100 feeds back to the transmitter 200 an ACK responsive to the long TTI packet in operation 1019.

Figure 11:
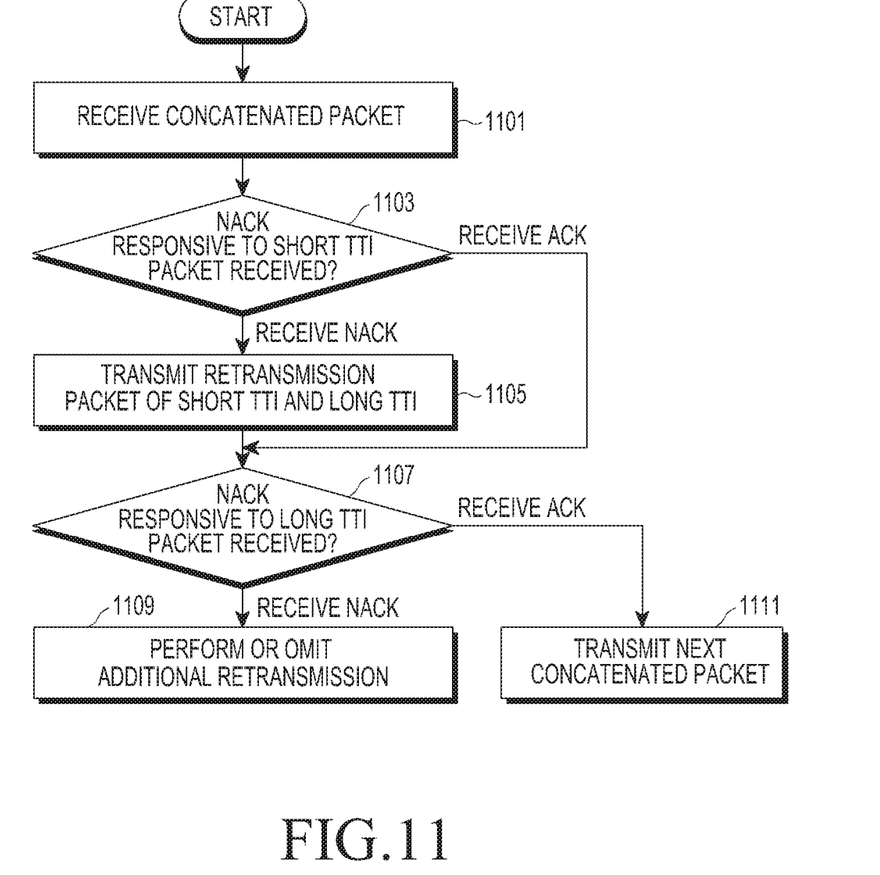
FIG. 11 is a flowchart illustrating a method performed by a transmitter conducting a HARQ operation using TTI concatenation including a short TTI according to an embodiment of the present disclosure.

FIG. 11 is a flowchart illustrating a method performed by a transmitter conducting a HARQ operation using TTI concatenation including a short TTI according to an embodiment of the present disclosure.

Referring to FIG. 11, in operation 1101, the transmitter 200 transmits a concatenated packet including a short TTI packet and long TTI packet. In operation 1103, when receiving a NACK responsive to the short TTI packet, the transmitter 200 transmits retransmission packets including a short TTI packet and long TTI packet in operation 1105. When the transmitter 200 receives a NACK responsive to the long TTI packet in operation 1107, the transmitter 200 may perform or abstain from transmission of additional retransmission packets in operation 1109. Whether to transmit additional retransmission packets in operation 1109 is determined depending on the design of system. Meanwhile, when the transmitter 200 receives an ACK responsive to the short TTI packet in operation 1103, the transmitter 200 goes to operation 1107 to perform subsequent operations. When the transmitter 200 receives an ACK responsive to the long TTI packet in operation 1107, the transmitter 200 transmits a next concatenated packet including new data in operation 1111.

Table 2 below is an operation summary of the TTI concatenation-based HARQ method. According to the instant embodiment of the present disclosure, when an error occurs in at least one of the short TTI packet and long TTI packet upon initial transmission, retransmission of the long TTI packet may be quickened, reducing a delay. This is why when the short TTI packet of the concatenated packet including the short TTI packet and the long TTI packet is encountered with an error, the long TTI packet also has a high chance of experiencing an error.

TABLE 2

| Case | data on short TTI | data on long TTI | impact on performance |
|---|---|---|---|
| 1 | NACK (target applied) | NACK | Quicken retransmission |
| 2 |  | ACK | — |
| 3 | ACK | NACK | same as legacy HARQ method |
| 4 |  | ACK |  |

In order to perform the TTI concatenation-based HARQ method, information exchangeable between transmitter and receiver according to an embodiment of the present disclosure may include at least one of 1) to 9) example pieces of information. As used herein, "short TTI packet" refers to a packet having a short TTI, and "long TTI packet" to a packet having a long TTI.

1) length of short TTI packet
2) length of long TTI packet
3) number of short TTI packets and long TTI packets constituting one concatenated packet
4) ACK/NACK feedback resource information regarding short TTI packet
5) ACK/NACK feedback timing information regarding short TTI packet (first time after transmission of short TTI packet)
6) ACK/NACK feedback resource information regarding long TTI packet
7) ACK/NACK feedback timing information regarding long TTI packet (second time after transmission of short TTI packet)
8) information on timing when the overall concatenated packet is retransmitted upon failure to receive short TTI packet (third time after transmission of short TTI packet)
9) information on timing when long TTI packet is retransmitted upon failure to receive long TTI packet (fourth time after transmission of long TTI packet)
10) condition for retransmission of the overall concatenated packet when two short TTI packets constitute one concatenated packet (failure to receive b or more short TTI packets, b≥1)

Figure 12:
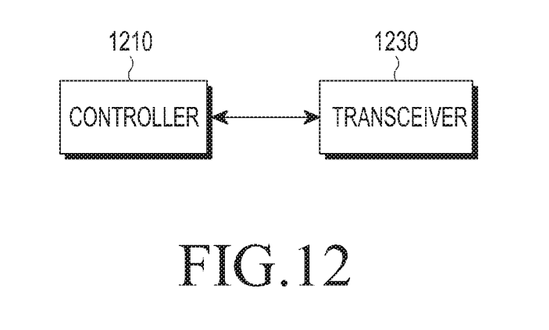
FIG. 12 is a block diagram illustrating a configuration of a transmitter or receiver performing a HARQ operation according to an embodiment of the present disclosure.

FIG. 12 is a block diagram illustrating a configuration of a transmitter or receiver performing a HARQ operation according to an embodiment of the present disclosure.

Referring to FIG. 12, the transmitter and receiver each may include a controller 1210 and a transceiver 1230. The controller 1210 controls the HARQ operations by a HARQ method using quick NACK feedback or TTI concatenation-based HARQ method as described above in connection with FIGS. 2, 3A, 3B, 4, 5, 6A, 6B, 7A, 7B, 8A, 8B, 9, 10, and 11. Specific operations are described above in connection with the above embodiments, and thus, no further detailed description thereof is given. The transceiver 1230 may include a transceiver for transmitting or receiving data through a wireless network.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing a hybrid automatic repeat request (HARQ) by a receiver in a wireless communication system, the method comprising:
   receiving a short transmission time interval (TTI) packet during a time period for receiving a first subframe from a transmitter, wherein the first subframe is configured to include the short TTI packet concatenated with a long TTI packet;
decoding the short TTI packet;
if decoding the short TTI packet fails;
    transmitting a message indicating a negative acknowledgement (NACK) corresponding to the short TTI packet to the transmitter; and
    receiving, in response to the message indicating the NACK corresponding to the short TTI packet, a retransmission subframe including the short TTI packet concatenated with the long TTI packet from the transmitter; and
if decoding the short TTI packet succeeds:
    transmitting a message indicating a positive acknowledgement (ACK) corresponding to the short TTI packet to the transmitter.

2. The method of claim 1, wherein the long TTI packet includes a single packet longer than the short TTI packet.

3. The method of claim 1, wherein the long TTI packet is configured by bundling multiple short TTI packets.

4. The method of claim 1, further comprising:
receiving the long TTI packet during the time period for receiving the first subframe from the transmitter;
decoding the long TTI packet,
if decoding the long TTI packet received in the subframe fails:
    transmitting a message indicating a NACK corresponding to the long TTI packet to the transmitter; and
    receiving, in response to the message indicating the NACK corresponding to the long TTI packet, a retransmission packet including the short TTI packet concatenated with the long TTI packet from the transmitter.

5. The method of claim 1, further comprising:
exchanging with the transmitter at least one of the length of the short TTI packet, the length of the long TTI packet, the number of short TTI packets and long TTI packets constituting one concatenated packet, ACK/NACK feedback resource information regarding the short TTI packet, ACK/NACK feedback timing information regarding the short TTI packet, ACK/NACK feedback resource information regarding the long TTI packet, ACK/NACK feedback timing information regarding the long TTI packet, information on a timing when the overall concatenated packet is retransmitted upon failure to receive the short TTI packet, information on a timing when the long TTI packet is retransmitted upon failure to receive the long TTI packet, or a condition for retransmission of the overall concatenated packet when the concatenated packet includes two or more short TTI packets,
wherein the condition comprises a failure to receive b or more short TTI packets, b≥1.

6. The method of claim 1, wherein the short TTI packet is disposed ahead of the long TTI packet in the subframe.

7. The method of claim 1, wherein the long TTI packet is disposed ahead of the short TTI packet in the subframe.

8. The method of claim 1, wherein the short TTI packet is decoded prior to the long TTI packet being decoded.

9. The method of claim 1, further comprising:
transmitting a message indicating NACK corresponding to the long TTI packet to the transmitter,
wherein a retransmission of the long TTI packet in response to the message indicating the NACK corresponding to the long TTI packet is omitted by the transmitter, if the transmitter transmitted the retransmission packet including the short TTI packet concatenated with the long TTI packet in response to the message indicating the NACK corresponding to the short TTI packet.

10. A receiver performing a hybrid automatic repeat request (HARQ) in a wireless communication system, the receiver comprising:
a transceiver; and
at least one processor coupled with the transceiver and configured to:
    receive a short transmission time interval (TTI) packet during a time period for receiving a first subframe from a transmitter, wherein first subframe is configured to include the short TTI packet concatenated with a long TTI packet,
    decode the short TTI packet, and
    if decoding the short TTI packet fails:
        transmit a message indicating a negative acknowledgement (NACK) corresponding to the short TTI packet to the transmitter, and
        receive, in response to the message indicating the NACK corresponding to the short TTI packet, a retransmission subframe including the short TTI packet concatenated with the long TTI packet from the transmitter, and if decoding the short TTI packet succeeds:
        transmit a message indicating a positive acknowledgement (ACK) corresponding to the short TTI packet to the transmitter.

11. The receiver of claim 10, wherein the long TTI packet includes a single packet longer than the short TTI packet.

12. The receiver of claim 10, wherein the long TTI packet is configured by bundling multiple short TTI packets.

13. The receiver of claim 10, wherein the at least one processor is further configured to control to:
receive the long TTI packet during the time period for receiving the first subframe from the transmitter,
decode the long TTI packet, and
if decoding the long TTI packet received in the subframe fails:
    transmit a message indicating a NACK corresponding to the long TTI packet to the transmitter, and
    receive, in response to the message indicating the NACK corresponding to the long TTI packet, a retransmission packet including the short TTI packet concatenated with the long TTI packet from the transmitter.

14. The receiver of claim 10,
wherein the at least one processor is further configured to control to exchange with the transmitter at least one of the length of the short TTI packet, the length of the long TTI packet, the number of short TTI packets and long TTI packets constituting one concatenated packet, ACK/NACK feedback resource information regarding the short TTI packet, ACK/NACK feedback timing information regarding the short TTI packet, ACK/NACK feedback resource information regarding the long TTI packet, ACK/NACK feedback timing information regarding the long TTI packet, information on a timing when the overall concatenated packet is retransmitted upon failure to receive the short TTI packet, information on a timing when the long TTI packet is retransmitted upon failure to receive the long TTI packet, or a condition for retransmission of the overall concatenated packet when the concatenated packet includes two or more short TTI packets, and wherein the condition comprises a failure to receive b or more short TTI packets, b≥1.

15. The receiver of claim 10, wherein the short TTI packet is disposed ahead of the long TTI packet in the subframe.

16. The receiver of claim 10, wherein the long TTI packet is disposed ahead of the short TTI packet in the subframe.

17. The receiver of claim 10, wherein the short TTI packet is decoded prior to the long TTI packet being decoded.

18. The receiver of claim 10,
wherein the at least one processor is further configured to transmit a message indicating NACK corresponding to the long TTI packet to the transmitter, and
wherein a retransmission of the long TTI packet in response to the message indicating the NACK corresponding to the long TTI packet is omitted by the transmitter, if the transmitter transmitted the retransmission packet including the short TTI packet concatenated with the long TTI packet in response to the message indicating the NACK corresponding to the short TTI packet.

19. A method for performing a hybrid automatic repeat request (HARQ) by a transmitter in a wireless communication system, the method comprising:
transmitting a short transmission time interval (TTI) packet during a time period for transmitting a first subframe, wherein the first subframe is configured to include the short TTI packet concatenated with a long TTI packet; and
if a message indicating a negative acknowledgement (NACK) responsive to reception of the short TTI packet transmitted in the subframe is received from a receiver receiving the short TTI packet, transmitting a retransmission packet including the short TTI packet concatenated with the long TTI packet.

20. The method of claim 19, further comprising:
if a message indicating a NACK responsive to reception of the long TTI packet, transmitted in the subframe, is received from the receiver receiving the concatenated packet, transmitting an additional transmission packet including the short TTI packet concatenated with the long TTI packet.

21. The method of claim 19, wherein, if a message indicating a NACK responsive to reception of the long TTI packet is received from the receiver receiving the concatenated packet, omitting retransmission of the transmission packet including the short TTI packet concatenated with the long TTI packet.

22. The method of claim 19, further comprising:
exchanging with the receiver at least one of the length of the short TTI packet, the length of the long TTI packet, the number of short TTI packets and long TTI packets constituting one concatenated packet, ACK/NACK feedback resource information regarding the short TTI packet, ACK/NACK feedback timing information regarding the short TTI packet, ACK/NACK feedback resource information regarding the long TTI packet, ACK/NACK feedback timing information regarding the long TTI packet, information on a timing when the overall concatenated packet is retransmitted upon failure to receive the short TTI packet, information on a timing when the long TTI packet is retransmitted upon failure to receive the long TTI packet, or a condition for retransmission of the overall concatenated packet when the concatenated packet includes two or more short TTI packets,
wherein the condition comprises a failure to receive b or more short TTI packets, b≥1.

23. The method of claim 19, wherein the long TTI packet includes a single packet longer than the short TTI packet.

24. The method of claim 19, wherein the long TTI packet is configured by bundling multiple short TTI packets.

25. The method of claim 19, wherein the short TTI packet is disposed ahead of the long TTI packet in the subframe.

26. The method of claim 19, wherein the long TTI packet is disposed ahead of the short TTI packet in the subframe.

27. The method of claim 19, wherein the short TTI packet is decoded by the receiver prior to the long TTI packet being decoded.

28. The method of claim 19, further comprising:
receiving a message indicating NACK corresponding to the long TTI packet to the transmitter,
wherein a retransmission of the long TTI packet in response to the message indicating the NACK corresponding to the long TTI packet is omitted by the transmitter, if the transmitter transmitted the retransmission packet including the short TTI packet concatenated with the long TTI packet in response to the message indicating the NACK corresponding to the short TTI packet.

29. A transmitter performing a hybrid automatic repeat request (HARQ) in a wireless communication system, the transmitter comprising:
a transceiver; and
at least one processor coupled with the transceiver and configured to:
transmit a short transmission time interval (TTI) packet during a time period for transmitting a first subframe, wherein the first subframe is configured to include the short TTI packet concatenated with a long TTI packet, and
if a negative acknowledgement (NACK) responsive to reception of the short TTI packet transmitted in the subframe is received from a receiver receiving the short TTI packet, transmit a retransmission packet including the short TTI packet concatenated with the long TTI packet.

30. The transmitter of claim 29, wherein, the at least one processor is further configured to:
if a message indicating a NACK responsive to reception of the long TTI packet, transmitted in the subframe, is received from the receiver receiving the concatenated packet, transmit an additional transmission packet including the short TTI packet concatenated with the long TTI packet.

31. The transmitter of claim 29, wherein, if a message indicating a NACK responsive to reception of the long TTI packet is received from the receiver receiving the concatenated packet, the at least one processor is further configured to control to omit retransmission of the transmission packet including the short TTI packet concatenated with the long TTI packet.

32. The transmitter of claim 29,
wherein the at least one processor is further configured to control to exchange with the receiver at least one of the length of the short TTI packet, the length of the long TTI packet, the number of short TTI packets and long TTI packets constituting one concatenated packet, ACK/NACK feedback resource information regarding the short TTI packet, ACK/NACK feedback timing information regarding the short TTI packet, ACK/NACK feedback resource information regarding the long TTI packet, ACK/NACK feedback timing information regarding the long TTI packet, information on a timing when the overall concatenated packet is retransmitted upon failure to receive the short TTI packet, information on a timing when the long TTI packet is retransmitted upon failure to receive the long TTI packet, or a condition for retransmission of the overall concatenated packet when the concatenated packet includes two or more short TTI packets, and wherein the condition comprises a failure to receive b or more short TTI packets, b≥1.

33. The transmitter of claim 29, wherein the long TTI packet includes a single packet longer than the short TTI packet.

34. The transmitter of claim 29, wherein the long TTI packet is configured by bundling multiple short TTI packets.

35. The transmitter of claim 29, wherein the short TTI packet is disposed ahead of the long TTI packet in the subframe.

36. The transmitter of claim 29, wherein the long TTI packet is disposed ahead of the short TTI packet in the subframe.

37. The transmitter of claim 29, wherein the short TTI packet is decoded by the receiver prior to the long TTI packet being decoded.

38. The transmitter of claim 29, wherein the at least one processor is further configured to receive a message indicating NACK corresponding to the long TTI packet to the transmitter, and wherein a retransmission of the long TTI packet in response to the message indicating the NACK corresponding to the long TTI packet is omitted by the at least one processor, if at least one processor transmitted the retransmission packet including the short TTI packet concatenated with the long TTI packet in response to the message indicating the NACK corresponding to the short TTI packet.

* * * * *